Oct. 27, 1925.

P. C. DONNER 1,558,466

PELT OR SKIN DEHAIRING MACHINE

Filed Nov. 13, 1924      6 Sheets-Sheet 4

INVENTOR.
Philip C. Donner,
BY
Fraentzel and Richards
ATTORNEYS.

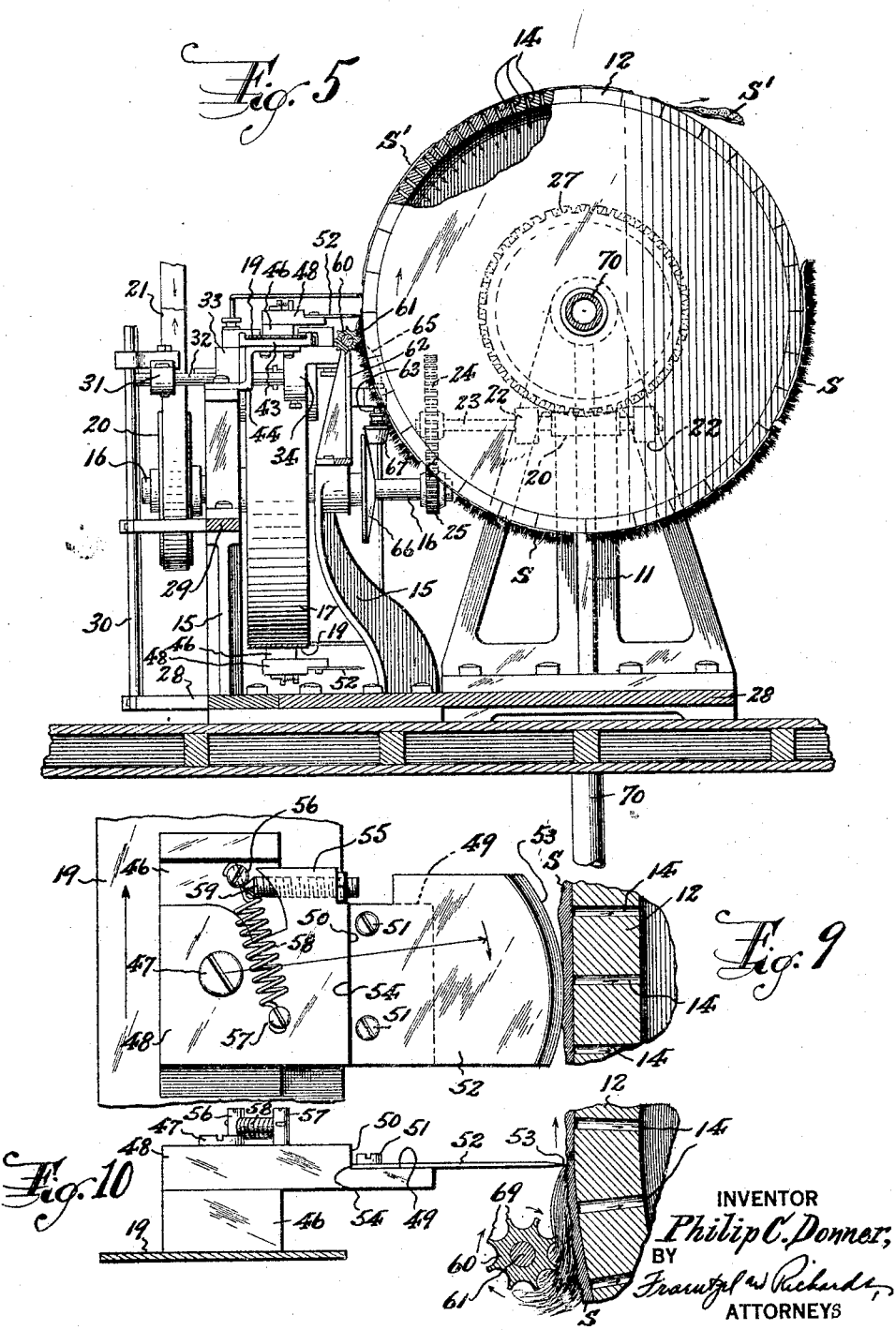

Oct. 27, 1925.
P. C. DONNER
1,558,466
PELT OR SKIN DEHAIRING MACHINE
Filed Nov. 13. 1924 6 Sheets-Sheet 6
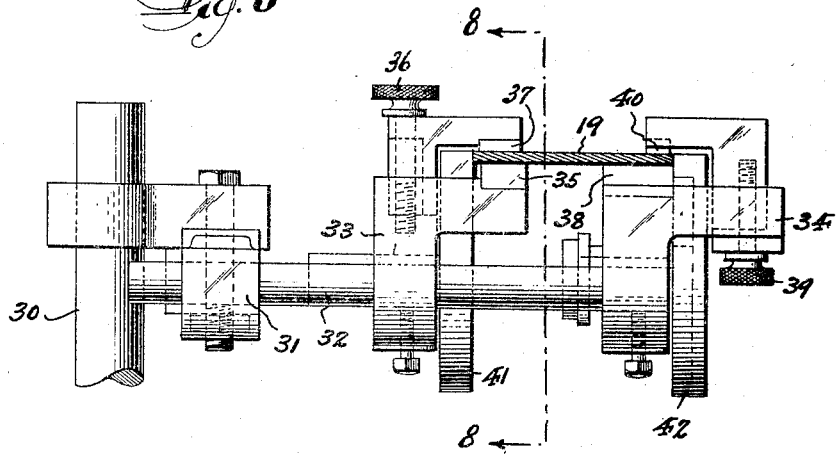
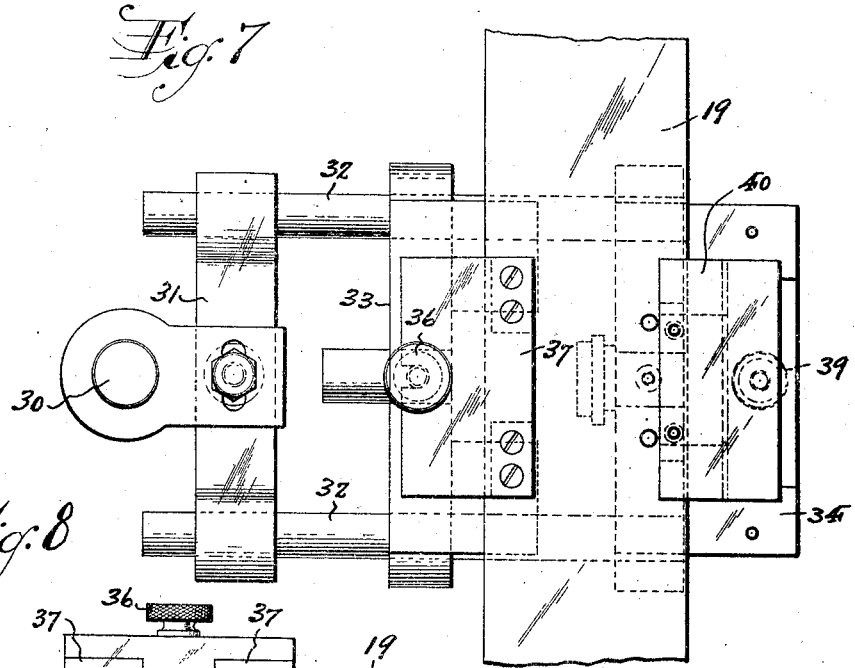
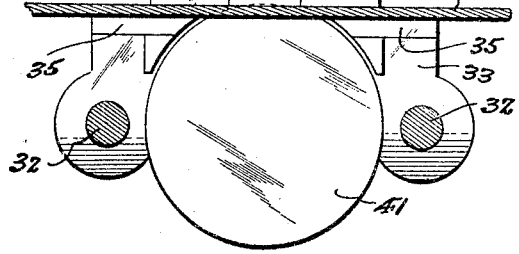
INVENTOR.
Philip C. Donner,
BY
Frantz and Richards
ATTORNEYS.

Patented Oct. 27, 1925.

1,558,466

UNITED STATES PATENT OFFICE.

PHILIP C. DONNER, OF SUMMIT, NEW JERSEY.

PELT OR SKIN DEHAIRING MACHINE.

Application filed November 13, 1924. Serial No. 749,615.

*To all whom it may concern:*

Be it known that I, PHILIP C. DONNER, a citizen of the United States, residing at Summit, in the county of Union and State of New Jersey, have invented certain new and useful Improvements in Pelt or Skin Dehairing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention, relates, generally, to an improved machine for dehairing animal pelts or skins; and the invention has reference, more particularly, to a novel automatic machine for cutting the hair or fur from animal pelts or skins to produce hatter's fur, or for other desired purposes.

The invention has for its principal object to provide an efficient automatic pelt or skin dehairing machine provided with a plurality of traveling cutting blades adapted to traverse the pelt or skin to sever the hair therefrom; and also provided with a novel means for feeding or presenting the pelt or skin to the action of the cutting blades, in combination with means for turning back the hair so as to present the base of the hairs, at a point close to the skin or hide, to the action of the cutting blades, to the end that a clean and thorough dehairing operation is carried out without waste or loss of hair, and with assurance that full lengths of severed hairs are obtained.

Other objects of this invention, not at this time more particularly enumerated, will be clearly understood from the following detailed description of the same.

With the various objects of this invention in view, the same consists, primarily, in the novel automatic pelt or skin dehairing machine hereinafter set forth; and, the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which:—

Figure 1:
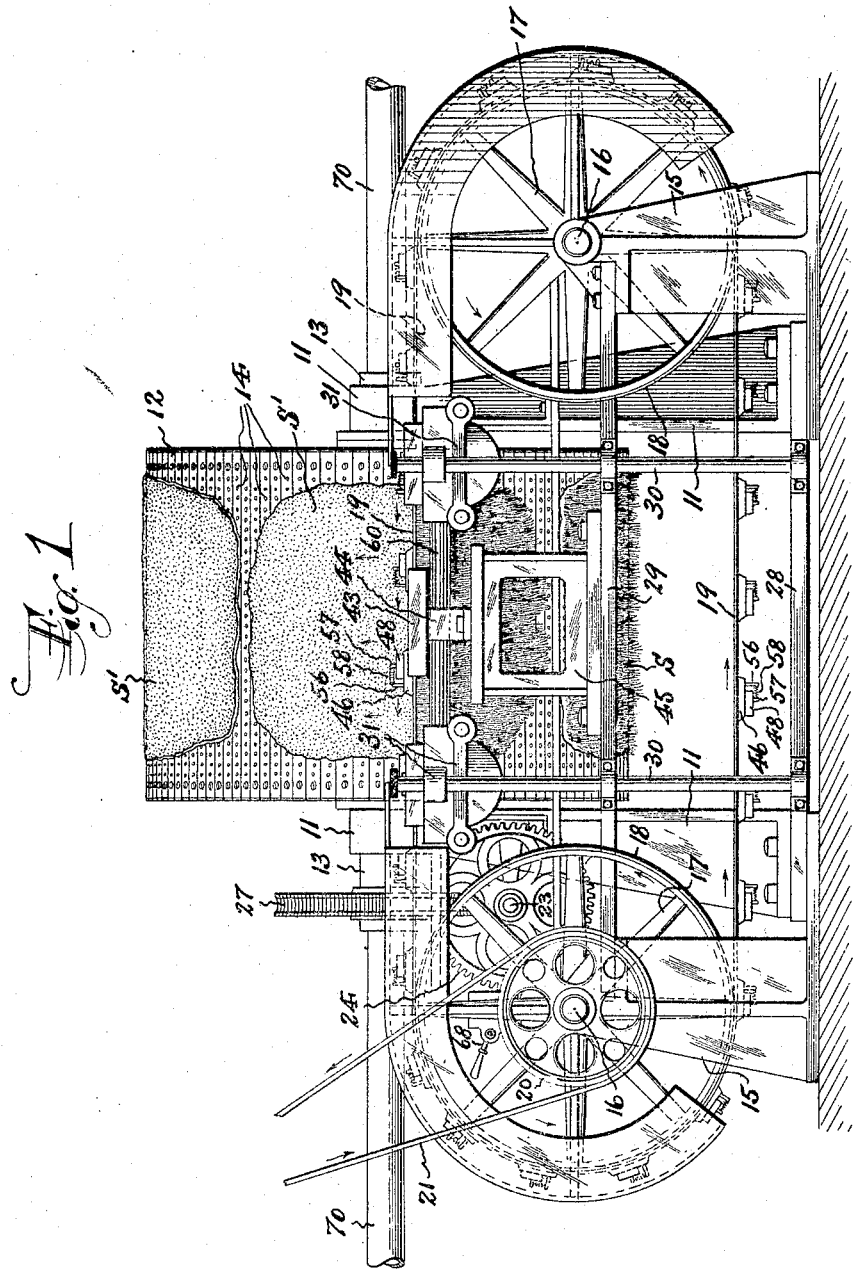
Figure 2:
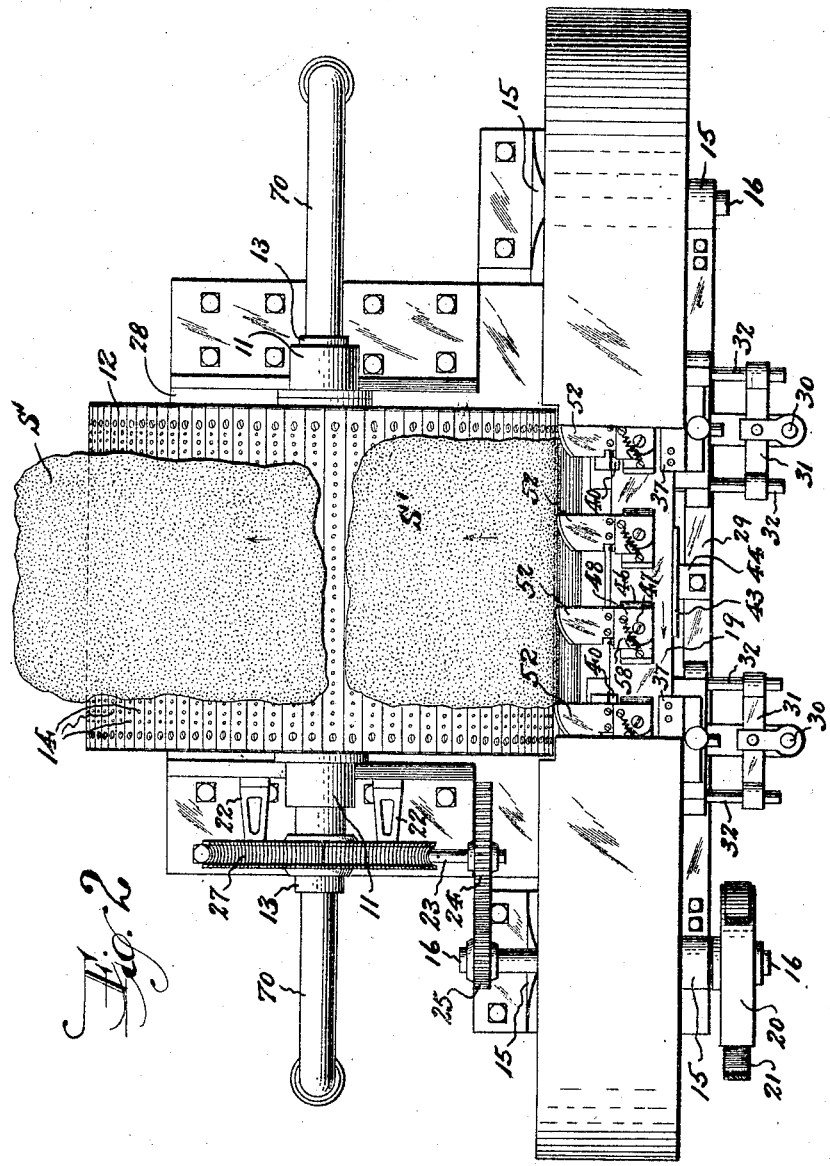
Figure 3:
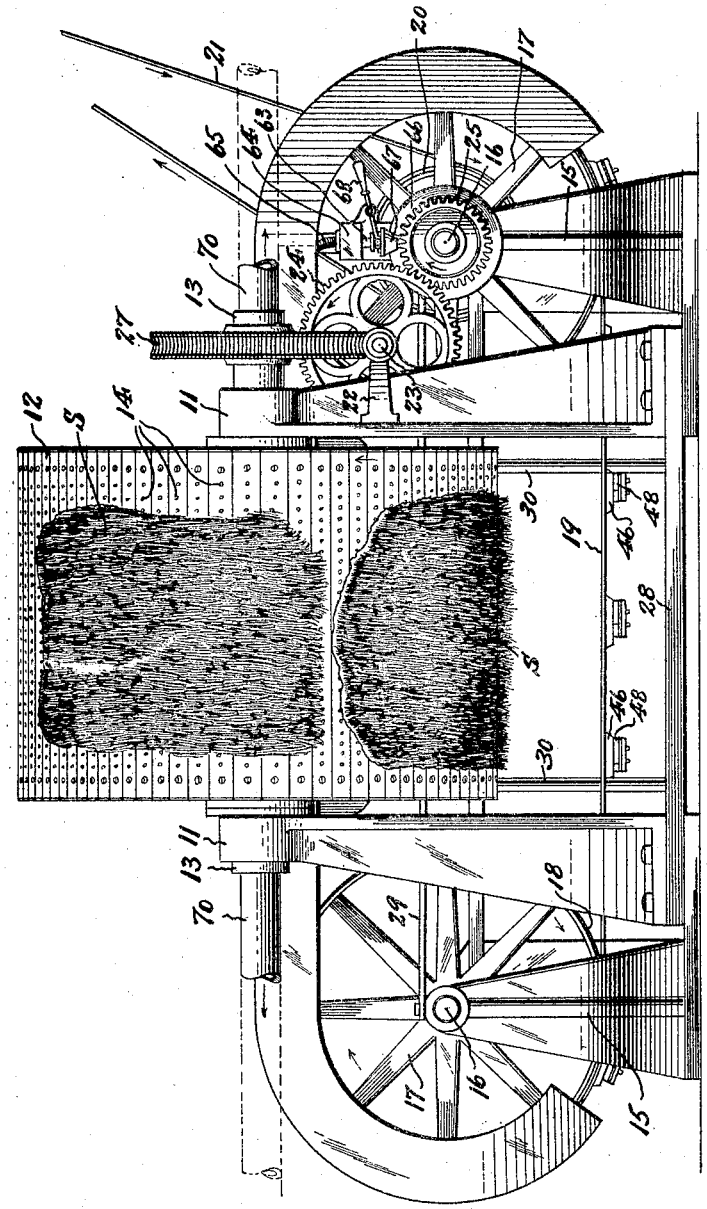
Figure 4:
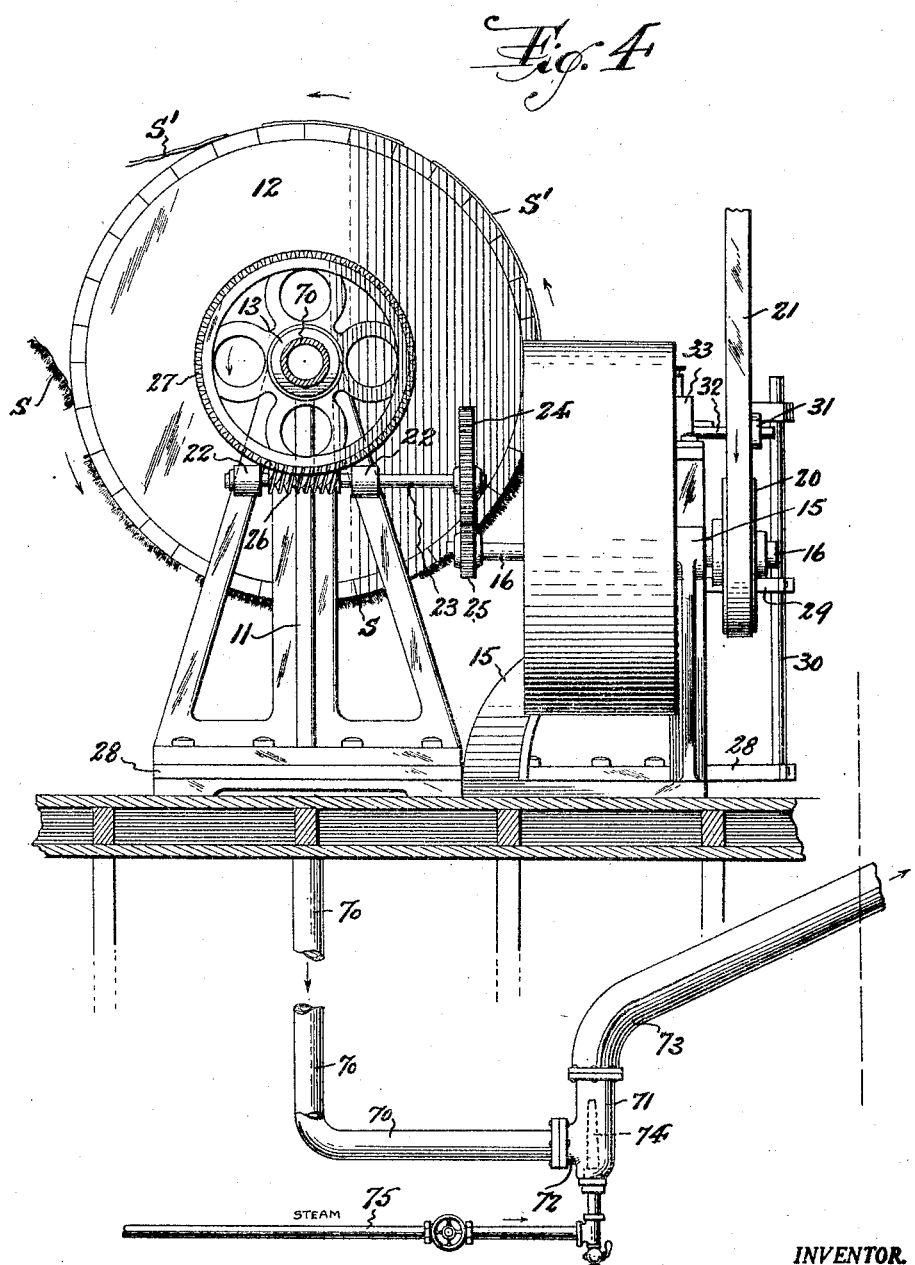

Figure 1 is a front elevation of the novel automatic dehairing machine, made according to and embodying the principles of this invention; Figure 2 is a top plan view of the same; Figure 3 is a rear side elevation or back view of the same; Figure 4 is a left end elevation of the same; Figure 5 is a vertical cross section through the same; Figure 6 is an enlarged detail side view of a knife-belt support and guide means; Figure 7 is an enlarged top or plan view of said knife-belt support and guide means; Figure 8 is a detail section, taken on line 8—8 in Figure 6; Figure 9 is an enlarged detail plan view of a cutting-blade element; and Figure 10 is a side elevation of said cutting-blade element.

Similar characters of reference are employed in all of the hereinabove described views, to indicate corresponding parts.

Referring now to said drawings, the reference character 11 indicates a pair of spaced pedestals or standards, which are suitably spaced apart to mount a rotary pelt or skin supporting and feeding drum 12. Said drum comprises a hollow cylindrical member, provided at its respective ends with hollow hubs or journals 13 which are mounted in said pedestals or standards 11 to rotatably support said drum. The cylindrical face wall of the drum 12 is provided with a multiplicity of perforations or suction ducts 14.

Disposed in front of said drum 12, and respectively offset relative to the opposite ends of the drum, are pairs of bearing standards 15, in each pair of which is journaled a transverse shaft 16. Fixed on each shaft 16 is a band-wheel 17, preferably provided with a facing 18 of rubber, or other similar material adapted to furnish a non-slipping surface. Running over and between said band-wheels 17 is an endless knife-belt 19, preferably made of steel, or other suitable non-stretching material. The upper course or run of said knife-belt 19 crosses the cylindrical face of said drum 12, at a distance suitably spaced outwardly therefrom.

The drum 12 and knife-belt 19 may be driven by any form of power transmission means found to be suitable or convenient. Illustrative of a power transmission means, which provides one form or arrangement suitable for the purpose, I have shown one of the band-wheel shafts 16 provided on its outer end with a drive-pulley 20, which may be driven by a belt 21 from any primary source of power, to in turn drive the band-wheel 17 thereon, and thus the knife-belt 19, the opposite band-wheel acting as an idler. The drum 12 may be driven at a desired speed from the opposite or inner end of said driven band-wheel shaft 16, and, to this end, bearings 22 are provided in connection with one of said pedestals or standards 11, in which is mounted a transverse shaft 23 having at its forward end a gear wheel 24, which meshes with and is driven by a gear 25 fixed on the inner end of said driven band-wheel shaft 16. Fixed on said transverse shaft 23 is a worm 26, which meshes with and drives a worm gear 27 which is fixed on the adjacent hub or journal 13 of the drum 12, thus producing the desired rotary movement of the latter in the direction indicated by the arrows in Figures 4 and 5. It will be understood that the gearing of the above-described transmission means may be so sized and proportioned, as to produce any desired speed of drum rotation relative to the speed of movement of cutting-blades carried by the knife-belt 19.

In order to provide stability, and to maintain the relative positions of the pedestals or standards 11 and bearing standards 15, the same are suitably interconnected together at their bases by a base-plate 28, and said bearing standards 15 are further interconnected together by an intermediate brace bar 29.

It is highly desirable that the knife-belt 19 should run straight and true without lateral wavering or displacement, especially with respect to its upper course or run, which crosses the face of the drum 12. To this end I have devised a pair of knife-belt guide devices, which are respectively disposed adjacent to the opposite ends of the drum 12. As shown in detail in Figures 6 to 8 inclusive, each knife-belt guide device comprises a vertical standard or post 30, suitably secured at its lower end to said base-plate 28, and further supported, by suitable means, in connection with said brace bar 29. Connected with the upper end of said standard or post 30 is a bracket-piece 31 which carries a pair of transverse spaced apart bracket-rods 32, disposed to project beneath the upper course or run of the knife-belt 19. Extending between and adjustably secured to said bracket-rods 32 are carrier-members 33 and 34. The carrier-member 33 is provided with a lower guide jaw 35, which engages the underside of said knife-belt 19 at one marginal edge portion thereof, and attached to said carrier member 33, by a thumb screw 36, is an upper guide jaw 37, which engages the upper side of said marginal edge portion of the knife-belt 19. The carrier-member 34 is also provided with a lower guide jaw 38, which engages the underside of said knife-belt 19 at the opposite marginal edge portion thereof, and attached to the carrier member 34, by a thumb screw 39, is an upper guide jaw 40, which engages the upper side of said marginal edge portion of said knife-belt 19. Said respective sets of upper and lower guide jaws, thus engaging the opposite marginal edge portions of the upper course or run of the knife-belt 19, tend to hold the latter steady and restrained against undue vertical vibration or movement as it moves abreast of the drum 12. Rotatably mounted in connection with carrier member 33 is an antifriction roller or wheel 41, against the face of which one edge of the knife-belt 19 runs, the lower guide-jaw 35 being cut away to straddle said roller or wheel 41; and, in like manner, rotatably mounted in connection with the carrier member 34 is an antifriction roller or wheel 42, against the face of which the opposite edge of the knife-belt 19 runs, the lower guide-jaw 38 being also cut away to straddle said roller or wheel 42. The respective rollers or wheels 41 and 42, engaging as they do opposite edges of the knife-belt 19, tend to hold the latter steady and restrained against lateral movement in horizontal plane as it moves abreast of the drum 12. If desired, additional support for the upper course or run of the knife-belt 19, as it travels abreast of the drum 12, may be provided intermediate the above-described guide devices. This additional support may comprise a channeled guide and supporting plate 43, through the upper channeled side of which the upper course or run of the knife-belt travels. Said guide and supporting plate 43 is itself supported by a bracket 44 fixed upon a frame 45 which is suitably secured to said brace bar 29.

Secured upon the exterior face of said knife-belt 19, at suitably longitudinally spaced intervals, are a plurality of cutting-blade devices. Each cutting-blade device comprises a base-block 46 which is rigidly secured to the body of the knife-belt 19 by any suitable means. Pivotally attached to said base-block, by a pivot or fulcrum screw 47, is a blade-carrier 48, which is capable of turning on the pivot or fulcrum screw in horizontal plane. Said blade-carrier 48 is provided at its forward free end, which normally projects toward the face of the drum 12, with a blade-seat 49 having at its rear or inner end a shoulder or abutment 50. Secured to said blade-seat 49, by screws 51 or any other suitable form of fastening means, is a cutting-blade 52, provided with an eccentrically curved or arcuate cutting-edge 53. The back or rear edge 54 of said cutting-blade 52, abuts against the shoulder or abutment 50, thereby holding the cutting-blade rigidly against play in its relation to the blade-carrier 48. The rearward left hand side of said blade-carrier 48 is cut away to provide a lateral extension or wing 55, or the latter may be formed or provided in any other manner found to be convenient. Rigidly secured to the base-block 46, to the left of the blade-carrier 48, and to the rear of the extension or wing 55 of the latter, is an upstanding stop-post 56. Connected with the upper side or face of said blade-carrier 48 is an anchor stud or screw 57, and interconnected between the stop-post 56 and anchor stud or screw 57 is a pull spring 58. Adjustably mounted in said extension or wing 55 is a stop-screw 59, the free end of which engages said stop-post 56 to thus determine the normal initial position of the blade-carrier and its cutting-blade. The cutting-blade, when supported or mounted on the knife-belt 19 in the manner above described, is yieldable in a direction opposite to the normal operative travel or movement of the upper course or run of the knife-belt 19.

Cooperating with the surface of the drum 12, at a point spaced a proper distance beneath the run of the cutting-blades 52, is a rotary hair-laying element or roll 60, which extends transversely across or abreast the circumferential face of the drum 12, and spaced a suitable distance outwardly from the drum surface. This hair-lying element or roll 60 is fixed upon a shaft 61 journaled in suitable bearing supports 62, and is operatively rotated in a direction opposite to the direction of rotation of the drum 12. A suitable means for driving the shaft 61 and the hair-laying element or roll 60 is provided, and may comprise a spindle 63 journaled in a vertical bearing bracket 64. Operatively interconnecting with the upper end of said spindle 63 and said shaft 61 is a flexible shaft 65. The lower end of said spindle 63 is disposed adjacent to said driven band-wheel shaft 16, and upon the latter is fixed, so as to be driven thereby, a friction clutch disc 66. Operatively movable upon said lower end of said spindle 63 is a friction cone 67, movable into and out of engagement with said friction clutch disc 66 by means of a suitable shift lever 68. When the cone 67 is engaged with the disc 66 power is transmitted from the latter to the former, and thence through the spindle 63 and flexible shaft 65 to the shaft 61, to thereby rotate the hair-laying element or roll 60. It will be evident, that other designs or arrangements of power transmission means for said hair laying element or roll 60 may be substituted for that thus above described within the scope of this invention. The hair laying-roll or element 60 is preferably made of rubber or similar material, and the same is longitudinally fluted to provide radially projecting ribs or combs 69, adapted to be successively carried into engagement with the hair or fur of a pelt or skin passed intermediate the surface of the drum 12 and the element or roll 60, so that the hair or fur will be turned and laid back, to expose its inner base ends only to the action of the cutting-blades of the machine, as illustrated in Figure 10 of the drawings.

In utilizing the drum 12 as the means for both supporting and feeding a pelt or skin to be dehaired by the action of the cutting-blade, it is necessary to provide for the attachment of the pelt or skin to the drum surface. So far as the aspects of this invention which are involved in the cutting-blade structure and operation are concerned, I intend to and do claim broadly any means for supporting and feeding the pelt or skin to the action of the cutting-blades, and when said supporting and feeding means is specifically restricted to a rotary drum, I intend to and do claim broadly any means for attaching the pelt or skin to the drum surface. Specifically, I have shown and will now describe and subsequently claim, in combination with the pelt or skin supporting and feeding means, an arrangement whereby air suction is utilized to cause the pelt or skin to attach itself to the surface of the supporting and feeding means.

As already above stated, the drum 12 is hollow, and is provided in connection with its cylindrical face wall with a plurality of suction ducts 14 extending inwardly from the outer surface to communicate with the hollow interior of the drum. Connected with at least one and preferably with both ends of the drum, are air exhaust pipes 70, which are telescopically fitted or engaged with the hollow hubs or journals 13, to thus communicate with the interior of the drum. The outer ends of said air exhaust pipes 70 are connected with a suitable air exhaust or suction means. This air exhaust or suction means may consist, if desired, of an inspirator-like device comprising a casing 71 having an air intake 72 with which said exhaust pipes 70 communicate, and a discharge conduit 73. Entering said casing 71, so as to project beyond the air intake 72 toward the discharge conduit 73 is a steam nozzle 74, with the outer end of which is connected a steam delivery pipe 75. Steam under pressure is discharged from said nozzle 74 to escape through the discharge conduit 73, and thereby creating a vacuum behind the nozzle so that air is sucked from said exhaust pipes 70 and consequently from the interior of said drum, creating thereby a suction effect at the suction ducts 14, so that when a pelt or skin is laid over the suction ducts 14, the unbalanced pressures between atmospheric pressure exterior of the drum and reduced air pressure within the drum, firmly attaches or causes the pelt or skin to adhere to the outer surface of the drum, whereby the drum not only supports the pelt or skin but rotation of the drum feeds the skin progressively toward the traveling cutting-blades of the machine.

In operation, when the machine is set in motion, the upper course or run of the knife-belt 19, as shown in the drawings, moves abreast the drum 12 in a direction from right to left, while the face of the drum 12, which is opposed to the moving knife-belt and its cutting-blades, moves upwardly to carry attached pelts or skins upwardly into the path of movement of the cutting-blades, and slowly feed the pelt or skin onward subject to the hair severing action of the cutting-blades. An operator stands at the rear side of the drum 12, and places against its perforate surface a skin or pelt S which is caused to attach itself thereto by suction, as above stated. The operator also removes or strips off dehaired skins or pelts S', as they are carried away from the cutting-blades. As the skin or pelt S is carried upward toward the cutting-blades, it first passes beneath the hair laying roll or element 60 (as shown in Figure 10) which, by its rotation in direction opposite to the movement of the drum, will brush or lay over the hair or fur of the pelt or skin S, as the latter approaches the path of movement of the cutting-blades, whereby the hair or fur is laid over or turned down rearwardly away from the cutting-blades, so that as the pelt or skin feeds onward only the bases thereof close to the surface of the pelt or skin are presented to the action of the cutting-blades, and consequently the hair or fur is severed very close to the hide. Such operation not only positions the hair or fur in best position for cutting, but also assures full lengths of hair with a minimum of waste. The rotary hair laying roll or element also tends to sweep downwardly the severed hairs, to separate the same from the pelt or skin, so that the same may be deposited in an underlying receptacle or any convenient receiving means therefor (not shown).

The speed of the knife-belt 19 relative to the feeding movement of the drum 12 is comparatively rapid, and consequently the running series of cutting-blades are rapidly swept across the pelt or skin S in quick and continuous succession, thus assuring the cutting contact of the blades with the hairs of the pelt or skin without likelihood of skipping. Since the cutting-blades 52 have eccentrically curved or arcuate cutting edges 53, and since, with their carriers 48, the cutting-blades are yieldable in a direction opposite to that of the movement of said upper course or run of the knife-belt 19, it follows that any obstacle carried into their path with the pelt or skin, such as an imbedded bullet or hard hide excresence, will not injure the cutting edges for the blades will yield rearwardly thereto, and thus pass over the same. Another and very important advantage of the rearwardly yieldable knife-blade with its receding ecentrically curved cutting edge, lies in the fact that such structure and arrangement attains automatic adjustment of the cutting edges to the hide, and permits the cutting-edge to automatically adjust itself to varying thicknesses or other irregularities of the hide of the pelt. From the above description it will be evident, that the novel dehairing machine operates in a very efficient and automatic manner to thoroughly and completely dehair skins or pelts without waste or injury to the hair or fur.

I am aware that some changes maye be made in the various arrangements and combinations of the several devices and parts, as well as in the details of the construction thereof, without departing from the scope of this invention as above described, and as defined in the appended claims. Hence, I do not limit my invention to the exact arrangements and combinations of said devices and parts as described in the foregoing specification, nor do I confine myself to the exact details of the construction of said parts as illustrated in the accompanying drawings.

I claim:

1. In a machine for dehairing pelts or skins, an endless knife-belt, means for driving said knife-belt, a plurality of successive cutting-blades on said knife-belt to project in horizontal plane from one edge of the latter, means for mounting said cutting-blades for yielding movement in a direction opposite to the direction of movement of said knife-belt, and means for supporting and feeding a pelt or skin for progressive movement into the path of said cutting-blades and subject to the cutting action thereof.

2. In a machine for dehairing pelts or skins, an endless knife-belt, means for driving said knife-belt, a plurality of cutting-blades mounted on said knife-belt, said cutting-blades being successively moved to cutting position by said knife-belt, means for supporting and feeding a pelt subject to the cutting action of said cutting-blades, and a hair-laying element cooperating with said supporting and feeding means for turning back the hair of said pelt to expose the bases thereof to the cutting action of said cutting-blades.

3. In a machine for dehairing pelts or skins, an endless knife-belt, a plurality of cutting blades successively mounted on said knife-belt to project transversely in horizontal plane therefrom, said cutting-blades being yieldable in a direction opposite to the direction of movement of said knife-belt, means for mounting and driving said knife-belt, and means for progressively feeding a pelt toward the operative path of movement of said cutting-blades.

4. In a machine for dehairing pelts or skins, an endless knife-belt, a plurality of cutting-blades successively mounted on said knife-belt to project transversely in horizontal plane therefrom, said cutting-blades being yieldable in a direction opposite to the direction of movement of said knife-belt, means for mounting and driving said knife-belt, means for progressively feeding a pelt toward the operative path of movement of said cutting-blades, and a hair-laying means cooperating with said feeding means for turning back the hair of said pelt to expose the bases thereof to the cutting action of said cutting blades.

5. In a machine for dehairing pelts or skins, an endless knife-belt provided with a plurality of successively disposed laterally projecting cutting-blades, spaced band-wheels over which said knife-belt runs, means for driving said band-wheels to operate said knife-belt, means for retaining the operative run or course of said knife-belt against undue play and displacement, means for progressively feeding a pelt toward the operative path of movement of said cutting-blades, and a hair-laying means cooperating with said feeding means for turning back the hair of said pelt to expose the bases thereof to the cutting action of said cutting blades.

6. In a machine for dehairing pelts or skins, an endless knife-belt, spaced band-wheels over which said knife-belt runs, means for driving said band-wheels to operate said knife-belt, means for retaining the operative run or course of said knife-belt against undue play or displacement, a plurality of cutting-blades pivotally mounted on said knife-belt in successive arrangement to project transversely in horizontal plane therefrom, means for retaining said cutting blades yieldable in a direction opposite to the direction of movement of said knife-belt, each cutting-blade having an eccentrically curved cutting-edge at its free end, and means for progressively feeding a pelt toward the operative path of movement of said cutting-blades.

7. In a machine for dehairing pelts or skins, an endless knife-belt, spaced band-wheels over which said knife-belt runs, means for driving said band-wheels to operate said knife-belt, means for retaining the operative run or course of said knife-belt against undue play or displacement, a plurality of cutting-blades pivotally mounted on said knife-belt in a successive arrangement to project transversely in horizontal plane therefrom, means for retaining said cutting blades yieldable in a direction opposite to the direction of movement of said knife-belt, each cutting-blade having an eccentrically curved cutting-edge at its free end, means for progressively feeding a pelt toward the operative path of movement of said cutting-blades, and a hair laying means cooperating with said feeding means for turning back the hair of said pelt to expose the bases thereof to the cutting action of said cutting blades.

8. In a machine for dehairing pelts or skins, a rotary pelt supporting and feeding drum, an endless knife-belt mounted to run abreast the face of said drum, a plurality of cutting-blades successively disposed on said knife-belt with their cutting edges projected in horizontal plane toward the opposed drum, means for driving said knife-belt, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

9. In a machine for dehairing pelts or skins, a hollow cylindrical drum having a multiplicity of suction-ducts perforating its cylindrical face, means for exhausting air from the interior of said drum whereby suction is utilized to attach a pelt to the face of said drum, an endless knife-belt mounted to run abreast the face of said drum, a plurality of cutting-blades successively disposed on said knife-belt with their cutting edges projected in horizontal plane toward the opposed face of said drum, means for driving said knife-belt, means for rotating said drum to carry an attached pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

10. In a machine for dehairing pelts or skins, a rotary pelt supporting and feeding drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, and means for rotating said drum to carry a pelt into the operative path of movement of said cutting-blades.

11. In a machine for dehairing pelts or skins, a rotary pelt supporting and feeding drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, means for rotating said drum to carry a pelt into the operative path of movement of said cutting blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

12. In a machine for dehairing pelts or skins, a hollow cylindrical drum having a multiplicity of suction-ducts perforating its cylindrical face, means for exhausting air from the interior of said drum whereby suction is utilized to attach a pelt to the face of said drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, and means for rotating said drum to carry a pelt into the operative path of movement of said cutting-blades.

13. In a machine for dehairing pelts or skins, a hollow cylindrical drum having a multiplicity of suction-ducts perforating its cylindrical face, means for exhausting air from the interior of said drum whereby suction is utilized to attach a pelt to the face of said drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

14. In a machine for dehairing pelts or skins, a rotary belt supporting and feeding drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, means for retaining the operative run or course of said belt against undue play and displacement, and means for rotating said drum to carry a pelt into the operative path of movement of said cutting-blades.

15. In a machine for dehairing pelts or skins, a rotary pelt supporting and feeding drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for retaining the operative run or course of said belt against undue play and displacement, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

16. In a machine for dehairing pelts or skins, a hollow cylindrical drum having a multiplicity of suction ducts perforating its cylindrical face, means for exhausting air from the interior of said drum whereby suction is utilized to attach a pelt to the face of said drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, means for retaining the operative run of course of said belt against undue play and displacement, means for rotating said drum to carry a pelt into the operative path of movement of said cutting-blades.

17. In a machine for dehairing pelts or skins, a hollow cylindrical drum having a multiplicity of suction ducts perforating its cylindrical face, means for exhausting air from the interior of said drum whereby suction is utilized to attach a pelt to the face of said drum, an endless knife-belt mounted to run abreast the face of said drum, a plurality of cutting-blades successively mounted on said knife-belt to project transversely in horizontal plane toward the opposed face of said drum, said cutting-blades being yieldable in a direction opposite to the direction of movement of said knife-belt, means for driving said knife-belt, means for retaining the operative run or course of said belt against undue play and displacement, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting-blades.

18. In a machine for dehairing pelts or skins, a rotary pelt supporting and feeding drum, an endless knife-belt having an operative course running abreast the face of said drum, spaced band-wheels over which said knife-belt runs, means for driving said band-wheels to operate said knife-belt, means for retaining the operative course of said knife-belt against undue play or displacement, a plurality of cutting-blades pivotally mounted on said knife-belt in successive arrangement to project transversely in horizontal plane toward the opposed face of said drum, means for retaining said cutting-blades yieldable in a direction opposite to the direction of movement of said knife-belt, each cutting-blade having an eccentrically curved cutting edge at its free end, and means for rotating said drum to carry a pelt into the operative path of movement of said cutting-blades.

19. In a machine for dehairing pelts or skins, a rotary pelt supporting and feeding drum, an endless knife-belt having an operative course running abreast the face of said drum, spaced band-wheels over which said knife-belt runs, means for driving said band-wheels to operate said knife-belt, means for retaining the operative course of said knife-belt against undue play or displacement, a plurality of cutting-blades pivotally mounted on said knife-belt in successive arrangement to project transversely in horizontal plane toward the opposed face of said drum, means for retaining said cutting-blades yieldable in a direction opposite to the direction of movement of said knife-belt, each cutting-blade having an eccentrically curved cutting edge at its free end, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting-blades.

20. In a machine for dehairing pelts or skins, a hollow cylindrical drum having a multiplicity of suction-ducts perforating its cylindrical face, means for exhausting air from the interior of said drum whereby suction is utilized to attach a pelt to the face of said drum, an endless knife-belt having an operative course running abreast the face of said drum, spaced band-wheels over which said knife-belt runs, means for driving said band-wheels to operate said knife-belt, means for retaining the operative course of said knife-belt against undue play or displacement, a plurality of cutting-blades pivotally mounted on said knife-belt in successive arrangement to project transversely in horizontal plane toward the opposed face of said drum, means for retaining said cutting-blades yieldable in a direction opposite to the direction of movement of said knife-belt, each cutting-blade having an eccentrically curved cutting edge at its free end, and means for rotating said drum to carry a pelt into the operative path of movement of said cutting-blades.

21. In a machine for dehairing pelts or skins, a hollow cylindrical drum having a multiplicity of suction-ducts perforating its cylindrical face, means for exhausting air from the interior of said drum whereby suction is utilized to attach a pelt to the face of said drum, an endless knife-belt having an operative course running abreast the face of said drum, spaced band-wheels over which said knife-belt runs, means for driving said band-wheels to operate said knife-belt, means for retaining the operative course of said knife-belt against undue play or displacement, a plurality of cutting-blades pivotally mounted on said knife-belt in successive arrangement to project transversely in horizontal plane toward the opposed face of said drum, means for retaining said cutting-blades yieldable in a direction opposite to the direction of movement of said knife-belt, each cutting-blade having an eccentrically curved cutting edge at its free end, means for rotating said drum to carry a pelt into the operative path of movement of said cutting-blades, a rotary hair laying roll opposed to the face of said drum beneath the operative path of movement of said cutting-blades, and means for rotating said hair laying roll in a direction opposite to the direction of rotation of said drum whereby the hair of the pelt is turned back to expose the bases thereof to the cutting action of said cutting blades.

In testimony that I claim the invention set forth above I have hereunto set my hand this 7th day of November, 1924.

PHILIP C. DONNER.